(12) United States Patent
Brown et al.

(10) Patent No.: US 6,976,058 B1
(45) Date of Patent: Dec. 13, 2005

(54) COMPUTER CARD FOR STORING BOOTABLE IMAGES AND PROVIDING REMOTE MANAGEMENT FUNCTIONS

(75) Inventors: Andrew Brown, Houston, TX (US); Jeff D. Pipkins, Spring, TX (US); David E. Neufeld, Magnolia, TX (US); Paul W. Hoke, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 760 days.

(21) Appl. No.: 09/675,281

(22) Filed: Sep. 29, 2000

(51) Int. Cl.$^7$ ............................................. G06F 15/16
(52) U.S. Cl. ..................... 709/217; 709/202; 709/203; 709/223
(58) Field of Search ................. 709/220, 221, 709/222, 223, 230, 203, 217, 202, 227; 713/1, 713/2, 155; 703/24; 345/520

(56) References Cited

U.S. PATENT DOCUMENTS

| | | | | |
|---|---|---|---|---|
| 5,146,568 A | * | 9/1992 | Flaherty et al. ................ | 703/24 |
| 5,452,454 A | * | 9/1995 | Basu .............................. | 713/2 |
| 5,887,164 A | * | 3/1999 | Gupta ............................ | 713/2 |
| 5,974,547 A | * | 10/1999 | Klimenko ....................... | 713/2 |
| 6,021,331 A | * | 2/2000 | Cooper et al. ............... | 455/507 |
| 6,202,091 B1 | * | 3/2001 | Godse ......................... | 709/222 |
| 6,205,547 B1 | * | 3/2001 | Davis ............................ | 713/1 |
| 6,223,284 B1 | * | 4/2001 | Novoa et al. ................ | 713/100 |
| 6,240,166 B1 | * | 5/2001 | Collin et al. ............. | 379/93.08 |
| 6,334,149 B1 | * | 12/2001 | Davis et al. ................. | 709/219 |
| 6,556,208 B1 | * | 4/2003 | Congdon et al. ............. | 345/520 |
| 6,560,706 B1 | * | 5/2003 | Carbajal et al. ............ | 713/155 |

OTHER PUBLICATIONS

*Boot Manage PXE Toolkit*, bootix Technology GmbH, 1989-2000 (3 p.).

*Intel® Preboot Execution Environment (PXE) Product Development Kit (PDK) Version 2.10*, Wired for Management, Intel Corporation, 2000 (2 p.).

* cited by examiner

Primary Examiner—Saleh Najjar
Assistant Examiner—Ben Bruckart

(57) ABSTRACT

A remote management console couples to a managed computer system via a management sub-system. The management sub-system is mounted in the managed computer system as a computer card, coupling to the system bus. The management console couples to the management sub-system through a local area network, through a direct telephone connection, or through the Internet. The management console transfers bootable images to the management sub-system, where the image is stored. When an image is received at the management sub-system, a flag is set in the managed computer system. During the subsequent boot cycle of the managed system, the bootable image is loaded and executed as part of the boot sequence.

28 Claims, 3 Drawing Sheets

COMPUTER CARD FOR STORING BOOTABLE IMAGES AND PROVIDING REMOTE MANAGEMENT FUNCTIONS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to a system for remotely managing a computer system or network. More particularly, the present invention relates to a remote management system that includes the capability of transferring a bootable image from a remote computer system to a system management board in a host computer system, and for causing the host computer system to boot the image during its boot cycle.

2. Background of the Invention

The concept of controlling a computer from a remote terminal is of great interest in many applications, especially in computer networks and in other situations where a user may not be able to physically access the computer. Computer networks such as LANs (local area networks) have become one of the most important devices for storing and sharing data in a business, and thus, computer networks are one of the most critical pieces of equipment in a business office. A failure in the computer network can cause business operations to grind to a halt. Computer networks typically comprise a plurality of personal computers and other data processing devices connected together for information exchange. At the heart of the computer network is one or more file servers. In most computer networks, file servers are responsible for administrating and storing the documents generated by each of the personal computers (PCs) in the system. In addition to managing the network, file servers also preferably include the capability to monitor faults in the computer network. If a fault or security breach is detected, the file server provides a warning of the fault and in certain instances may also provide diagnostic operations and may even implement corrective measures.

Files and data are maintained by a host processing system within the server. Servers are designed to provide work stations with fast access to files stored by the server. Accordingly, file servers embody a computer which responds to an operating system program (a popular operating system being, for example, WINDOWS NT®, or NETWARE®) to not only orchestrate the files but also to maintain file security, file backup, or other file management features. One important aspect which flows from maintaining these functions within a server is the capability to manage the server from a remote site, and to even permit management of the server from sites remote from the network. There has been a steady increase in the number of servers that are used in businesses. The trend is to place one or more servers at each location of a business, rather than using a single main frame computer at a centralized location. Typically, a company has an individual or department responsible for administering all of the file servers. In many instances, the administrator or administration department is headquartered at one site. Thus, each of the servers must either be maintained and administrated remotely or else personnel must be transported to remote offices to permit on-site management.

Numerous monitoring systems are available to automatically alert designated persons when a PC, server or software application has failed. When such a failure occurs, the persons being notified may be in a remote location and not able to directly access the failed PC. In such an instance, the person may have access to a computer that is remotely connected to the failed computer or server, but may be unable to access the failed device. These may arise either because the processor in that device has failed and will no longer respond, the application running on the failed computer does not support remote PC access, or the failed computer not have the necessary software installed to permit a remote PC to access it. Various systems exist to permit a PC to be remotely or automatically rebooted, which in many cases restores the PC to normal operation. However, network administrators are reluctant to use such systems without first determining what may have caused the failure, so that similar failures can be prevented in the future.

Operating systems may permit access to the computer or server being managed from a remote site, often call a "remote terminal." A remote terminal, while not physically connected to the computer or server, nonetheless allows remote control of certain operations. Products such as Compaq Server Manager® and Compaq Remote Insight Manager®, obtainable from Compaq Computer Corp., have attempted to address some of the issues involved in managing a network of distributed servers from a single, remote site. These products permit an administrator to be notified of a remote server failure, to reset the server from the remote site, and to access certain information provided on the server. Compaq's Insight Manager® permits remote maintenance of the file server as well as local and remote notification of errors. In addition, Insight Manager® permits the file server to be re-booted from a remote location or from any system on the network. Insight Manager® also provides control facilities including diagnostic capabilities to analyze the condition of the server system configuration and to update system firmware. Insight Manager® collects and monitors server data as well as data from each client in the network and allows the network manager to act on the data from a remote location or any work station on the network. In addition, Insight Manager® includes the capability to set user defined thresholds which permit the server to monitor system parameters and to alert the network manager when an error occurs. Notification in the event of an alert or a failure is delivered in many possible ways including on-screen messages, a pager, e-mail, fax and SNMP.

It is certainly beneficial to allow remote control of certain server functions, especially those needed to reset one or more servers within a network of servers. Downtime caused by server failure may be the most costly expense incurred in running a distributed computer system. The causes of server failure or "crash" are numerous. Any number of malfunctions or design flaws associated with the server hardware, server operating system or application programs running on a server may cause a server to crash. If a server crashes, then file access is often lost and business records are temporarily inaccessible until the cause of failure is fixed.

In certain instances, it may be necessary to install new software or boot code in a remotely-managed computer system. For example, if a system crashes and cannot be re-started, it may be necessary to boot the computer with boot code from a floppy disk. It may also be necessary to re-program the BIOS ROM or the flash ROM of the computer system if the ROM code becomes corrupted, or needs to be modified. It may also be necessary to install a new operating system from time-to-time, as upgrades and modifications are made to the operating system currently in use. These types of changes to the core programs in a computer system typically cannot be handled from a remote location.

Various software systems have been developed that link one PC with other PC's using modems connected over standard telephone lines either via direct connections or through the Internet. These systems permit a host PC to be controlled by a remote PC. Function keys and menus are used in these systems to permit the remote PC to operate the host PC, as if the remote user was physically sitting at the host PC. Some examples of computer packages that function in this manner are Carbon Copy, PC Anywhere, Remotely Possible, Timbuktu, and Citrix MetaFrame. In commonly assigned U.S. application Ser. No. 08/775,819, filed Dec. 31, 1996, entitled, "Diagnostic Board With System Video And Keyboard For Host Server System To Permit Remote Operations In A Terminal Mode," a system management module for a host server system is disclosed that includes a system management processor connected to a system management local bus. The system management local bus connects to the system PCI bus through a system management central control unit. The system management module includes a video controller and/or keyboard and mouse controller connected to the system management local bus to support remote consoling of the system management module, even in the event that the system bus fails. Also, in commonly assigned U.S. application Ser. No. 09/544,573, filed Apr. 6, 2000, entitled "USB Virtual Devices," a management sub-system connects to a managed server and emulates a USB device, so that a remote management console can operate as a USB virtual terminal. The teachings of U.S. application Ser. No. 08/775,819 and 09/544,573 are incorporated herein by reference.

While these systems permit the remote user to take control of the host computer, in the sense that the remote computer can transmit certain input signals such as keyboard and mouse commands, most do not permit the remote computer to load basic core software from the peripheral drives of the remote computer to the host computer, or permit the other peripheral devices that might be available on the remote computer to be used in operating the host computer. Thus, if a network administrator has operating system software or boot code to be loaded on the host computer, the administrator typically must gain physical access to the host computer. Because most of the various peripheral devices of the remote computer are essentially unavailable in the remote administration of a host computer, the network administrator must physically visit the host computer to perform many basic maintenance tasks that simply cannot be performed at this time remotely. Thus, for example, if new operating system software must be loaded on a managed server, a network administrator must physically travel to the site of that server. As a result, many companies that have network facilities at different locations must employ separate network administrators at each facility or else pay for transportation between the various facilities, thus greatly increasing the cost of administering the company's network.

One software tool that does exist for permitting software to be installed remotely is the Intel PXE (Preboot Execution Environment) Toolkit. The PXE Toolkit enables certain software (including some operating systems) to be installed remotely under certain conditions. For the installation to occur, however, the computer system receiving the installation must be operational because the software to be installed is temporarily stored in the random access memory of that computer. Thus, if the system has crashed, or is otherwise inoperable, this product has limited use. Consequently, if a system has crashed and cannot reboot, it is still necessary to have personnel travel to the computer site to perform repairs on site.

It would be desirable if a system was available that permitted software to be remotely installed on a computer system, even if that computer system had failed and could not be booted. In particular, it would be advantageous if a system was available that could be used to boot the system remotely using new or modified boot code. It would also be beneficial if the system permitted other software to be installed, or system devices to be re-programmed, all from the remote location. Despite the apparent advantages such a system would offer, to date no such system is available.

BRIEF SUMMARY OF THE INVENTION

The present invention solves the deficiencies of the prior art by including a management sub-system in the host or managed PC. The management sub-system preferably connects via a network connection or through a modem to a remote management console. The management sub-system includes a processor and memory, which couple to the host processor and other logic through a conventional system bus. The management sub-system receives an image of a floppy drive or other peripheral drive from the remote console, and then emulates a floppy drive during the subsequent boot cycle of the host system. This emulation causes the host system to look to the management sub-system for boot code, which is then loaded and executed during the subsequent boot cycle of the host system.

A program to be installed on the host computer system is loaded in memory at the remote management console, such as via a floppy drive included in the remote management console. Other mediums can be used to load the program other than a floppy drive, although preferably the program is partitioned into smaller segments that can be stored in memory in the management sub-system. An image of the floppy drive is transferred to the memory sub-system, where it is stored in memory. Preferably, the management processor executes FTP (file transfer protocol) or TFTP server software to obtain the image from corresponding client software at the remote management console. Once the image is obtained, the management sub-system transmits a control signal to the host system, causing a flag to be set in an appropriate register. During the subsequent boot cycle of the host system, the host processor checks the flag as part of initializing the boot cycle. If the flag is set, the host system looks to the management sub-system and loads boot code from the memory on the management card, which is executed during the boot cycle. Alternatively, the host system may perform an inquiry to the management sub-system on every boot cycle to determine if the management subsystem has boot code to be executed.

According to one embodiment of the invention, the management sub-system comprises a computer card that can be installed in the host PC. The management card includes a processor and memory, in addition to a network interface and/or modem. The management card preferably includes a connector for coupling to one of the system buses of the host computer system, such as the PCI bus. The management card couples to the remote management console via the network interface or through the modem. Images from the remote console are stored in memory on the management card. The memory may comprise either standard RAM, or may be battery-backed RAM or non-volatile RAM. After the image is stored in the memory of the management card, the management processor transmits a signal to the host system, causing a flag to be set. During the next boot cycle of the host system, which may be initiated by the management processor, the host system checks the status of the flag, or otherwise makes an inquiry to the management processor to determine if a floppy image is present in the memory on the management card. If so, the image is transferred to the host system and executed as boot code.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections. The term "host computer" or "managed computer system" means a computer system that includes a management sub-system, either as a plug-in card or as an integrated component that has been pre-assembled or assembled as part of the computer system. The term "management console" means a computer or server that includes a console with input and output capabilities that can be used to manage the host computer. The term "computer" is used in this specification broadly and includes a personal computer, workstation, server, or other microprocessor-based device which can be programmed by a user to perform one or more functions and/or operations. To the extent that any term is not specially defined in this specification, the intent is that the term is to be given its plain and ordinary meaning.

DETAILED DESCRIPTION OF THE PREFERRED EMBODIMENTS

Figure 1:
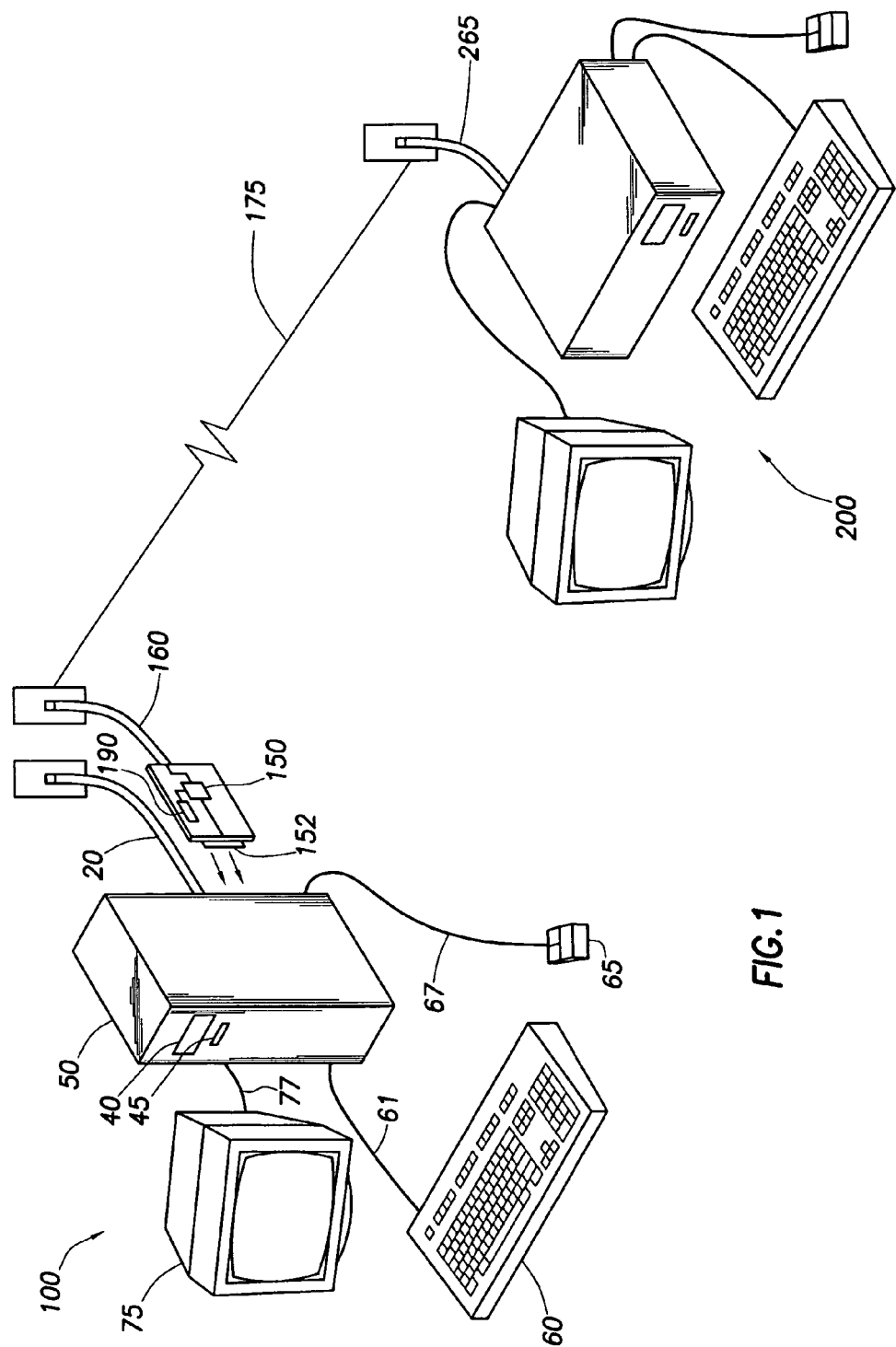
FIG. 1 depicts a host system with a management card, coupled to a remote management console, in accordance with the preferred embodiment of the present invention.

Referring initially to FIG. 1, the present invention preferably comprises a managed computer or server system 100, a management sub-system 150 connected to the computer system 100 (or managed server) via suitable connectors 152, and a management console 200 connected to the management sub-system 150 via a communications line 175. The computer system 100 constructed in accordance with a preferred embodiment of the invention generally comprises a computer chassis 50, a computer monitor 75, a keyboard 60 and a mouse 65. The chassis 50 may house various electrical components that perform the computing functions of the computer. In accordance with normal convention, the chassis 50 houses a CD-ROM drive 40 and a floppy disk drive 45. Various other drives may also be included in chassis 50, including for example, DVD-ROM drives, ZIP drives, PCMCIA slots/drives, and the like. These drives permit removable storage media to be inserted in appropriate receptacles, where the data stored on the media may be read by the circuitry in the computer.

The input devices, which in most instances comprises the keyboard 60 and mouse 65, connect via cables 61, 67, respectively to appropriate ports or connectors on the chassis 50 to permit the user to input instructions to the computer. Other input devices may also be provided in addition to, or in place of, those shown. In addition, the input devices may be coupled to the computer using wireless communications, such as infrared transmission. The computer monitor 75 may be separate from the chassis 50, or may be integral with the chassis, depending upon the desired configuration of the computer system. If separate from the chassis, a suitable cable 77 couples the monitor to the electronics in the chassis.

In the preferred embodiment, the computer system 100 comprises a server that couples via a suitable network connection to one or more personal computers. The server stores files and data on behalf of the network computers, and facilitates the interconnection and access of information by computers in the network. Thus, in accordance with normal convention, computer system 100 couples via an Ethernet cable 20 to one or more computers or servers in a local area network (LAN).

Referring still to FIG. 1, the management sub-system 150 preferably comprises a computer card that may be physically inserted into the chassis 50 of the computer system 100, as shown by the arrows in FIG. 1. Alternatively, the management sub-system may comprise a housing that is configured separately from the chassis 50, and connected by suitable connections to the computer system 100, as will be explained in more detail below. As yet another alternative, the management sub-system may be provided on a circuit board or a computer system board pre-assembled within the chassis of the computer system 100. In the preferred embodiment, the management sub-system 150 connects via connectors 152 on the edge of the card to a system bus in the computer system 100, such as, for example, a PCI (Peripheral Component Interconnect) bus. As one skilled in the art will appreciate, the management sub-system may couple to other system busses within the host computer system 100, instead of the PCI bus.

As shown in FIG. 1, the management sub-system preferably couples to an Ethernet line or to some other suitable network connection via line 160. Preferably, line 160 couples the management sub-system 150 to a telephone line or other suitable communication line, such as an ISDN line or DSL line to permit remote communication to the management console 200, which may be located remote from the local area network. Thus, the management sub-system may communicate with a management console 200, which may be located either on the network or at a location remote from the network. Communication line 175 is intended to represent either of these possibilities. One skilled in the art will appreciate that other network circuitry and connections in the form of routers, hubs, modems and the like may be used to implement the communication path to the management console 200. For the sake of simplicity, these additional components have been omitted.

Referring still to FIG. 1, the management console 200 couples to the communication line 175 via a suitable link 265. As noted above, the communication line 175 may comprise a network line, a telephone line, ISDN, DSL, or other communication link, an Internet connection, or a combination of one or more of these. The management console 200 preferably includes a computer chassis 250, a computer monitor 275, a keyboard 260 and a mouse 255. The chassis 250 may house various electrical components that perform the various computing functions of the console, which preferably comprises a standard personal computer or web computer. In accordance with normal convention, the chassis 50 houses a CD-ROM drive 240 and a floppy disk drive 245. Various other drives may also be included as part of the chassis 250, including for example, DVD-ROM drives, ZIP drives, and PCMCIA slots/drives. These drives permit removable data storage media to be inserted in appropriate receptacles, where the data stored on the media may be read by the circuitry in the management console. As one skilled in the art will appreciate, other peripheral drives and devices also may be located external to the chassis 250, that connect to the console through suitable ports or connections.

The input devices, which typically comprise the keyboard 260 and mouse 255, connect via cables 263, 257, respectively to appropriate ports or connectors on the chassis 250 to permit the user to input instructions to the computer. Other input devices also may be provided in addition to, or in place of, those shown. In addition, the input devices may be coupled to the computer using wireless communications, such as infrared transmission. The computer monitor 275 may be located separate from the chassis 250, or may be formed integrally with the chassis, depending upon the desired configuration of the system. If separate from the chassis, a suitable cable 277 couples the monitor to the electronics in the chassis.

Figure 2:
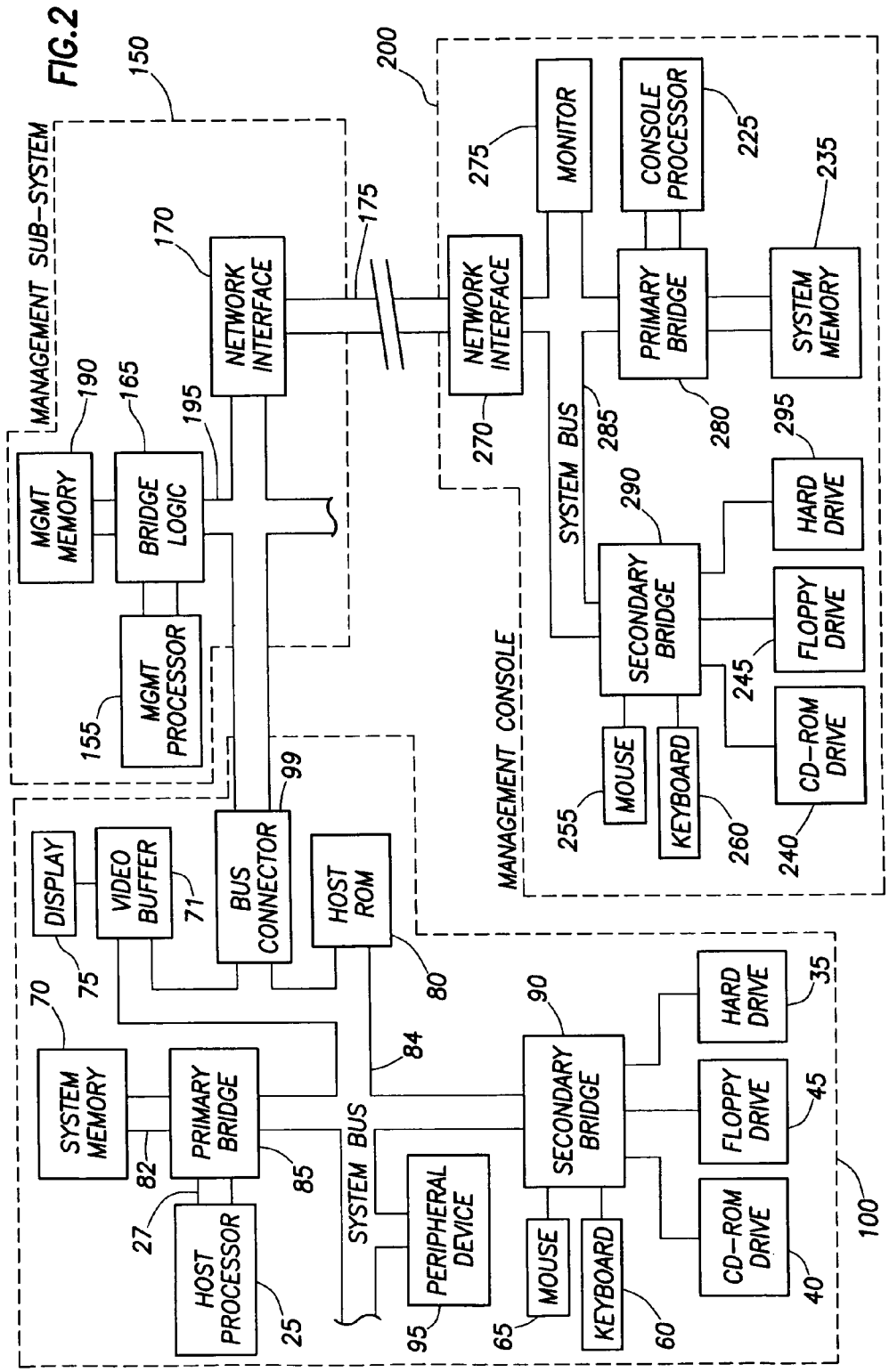
FIG. 2 is a block diagram showing the architecture of the host system, management card, and remote management console, in accordance with the preferred embodiment.

Referring now to FIG. 2, the host system 100, management sub-system 150 and remote console 200 are shown in more detail in block diagram form. Before discussing FIG. 2, it should be understood that this architecture is intended to be exemplary of a host system that may accept a memory management sub-system, and is not intended to indicate that this architecture is required. Virtually any computer system may be used which is capable of booting and operating a conventional operating system. Similarly, it should also be understood that the architecture of the remote management console also is intended to be exemplary, and the exact architecture employed at the remote management console is not critical.

As shown in FIG. 2, the managed computer 100 preferably comprises a standard computer architecture, including a host processor 25, system memory 70, bus bridges 85, 90 and display 75. The server processor 25 preferably couples to system memory 70 through a primary bridge device 85. It should be understood that other embodiments of the invention may include more than one processor or CPU. The processor may comprise any suitable microprocessor such as the Pentium II®, Pentium III®, or Celeron® processor by Intel®, the Athlon® processor by AMD, or other microprocessors from these or other manufacturers that may be used or configured for use in a computer system. The system memory 70 preferably comprises one or more memory devices such as any suitable type of random access memory that connect to the bus bridge via a memory bus 82. System memory 70 may comprise, for example, synchronous dynamic random access memory (SDRAM), or other memory designs suitable for use in a computer. The primary bridge 85 permits the processor 25 and other devices in computer system 100 to read data from or write data to system memory 70. Although not shown in FIG. 2, the primary bridge 85 may include an interface to an advanced graphics port (AGP) to support a graphics accelerator or other graphics devices (including a monitor) or memories that reside on an AGP bus.

The primary bridge 85 also preferably includes an interface to a system or peripheral bus 84. In the preferred embodiment, the system bus 84 comprises a Peripheral Component Interconnect (PCI) bus, to which the primary bridge 85 interfaces. Various system bus compliant devices 95 may connect to the system bus 84. Through primary bridge 85, the processor 25 can communicate with various system devices, including the peripheral devices 95, host ROM 80, and other devices connected to the system bus 84 by bridge 90. In accordance with the protocol of various system buses, such as the PCI bus, various PCI bus masters may read data from and write data to system memory 70 via the primary bridge 85. The bridge 85 preferably contains a memory controller and arbiter (not specifically shown) to provide controlled and efficient access to system memory 70 by the various devices in computer system 100 such as processor 25 and other system devices.

Computer system 100 preferably also includes a secondary bridge device 90 which bridges the system bus 84 to other expansion buses such as an Industry Standard Architecture (ISA) bus, sub-ISA bus, or X bus. Other devices, such as a hard disk drive 35, CD-ROM drive 40, and floppy drive 45, preferably couple to secondary bridge device 90. Other drives also may be provided as desired. Drives 35, 40, and 45 can be accessed by the processor 25 through the primary bridge 85 and secondary bridge 118. One of ordinary skill in the art will recognize that one or more disk drive controllers (not shown) may also be included to provide effective data transfers to and from these drives. Similarly, the keyboard 60 and mouse 65 also preferably connect to the secondary bridge 90, which relays input signals from a local user to the processor 25. Also, as shown in FIG. 2, a video buffer 71 couples to the system bus 84 (or to some other bus, such as an AGP bus) to receive video signals to be displayed by a suitable computer monitor or display 75. One or more suitable bus connectors or slots 99 connect to the system bus 84 to permit other compatible peripheral devices to be added to the system if desired.

The host ROM 80, while shown connected to the PCI bus, may be located elsewhere in the host system 100, if desired. The host ROM 80 preferably comprises read only memory which stores certain software that can not be easily overwritten. Thus, for example, the host ROM 80 preferably stores boot code and other basic input/output system (BIOS) code that is used by the processor to boot the computer system, and to initialize the system components.

Referring still to FIG. 2, the management sub-system 150 preferably comprises a management processor 155, management memory 190, bridge logic 165 and network interface logic 170. The management processor 155 preferably provides information to the host system 100 relating to error detection and system administration to reduce the load on the server processor 25. In addition, the management processor 155 preferably functions as a "survival" processor in the event the server processor 25 "hangs" or is rendered inoperable by system error. The management processor 155 thus permits access to the server system 100 for purposes of accessing system components via the system bus 84 to determine the source of any error in the host system 100. The management processor 155 also preferably detects other system errors and isolates the source of the errors to permit the host system 100 to continue operations.

The management memory 190 includes random access memory as the working memory of the management processor 155, preferably in the form of dynamic random access memory (DRAM). Other types of memory circuits also may be used such as static random access memory (SRAM) circuits, battery-backed RAM and/or non-volatile RAM, if desired. In addition, the management memory 190 may also include read-only memory to permanently store code for execution by the management processor. Thus, the management memory 190 preferably is used to store data and code for execution by the management processor 155. In addition, the management memory 190 may be used by the management processor 155 to store information relating to the state of the host system, including diagnostic and event log information. Thus, for example, the management memory 190 preferably stores abnormal end (ABEND) information, IML (event log information), diagnostic information, and asset management information. According to the principles of the present invention, the management memory 190 also preferably stores floppy disk images or other bootable images that are received from the remote management console 200 for installing in the host computer system 100, as will be discussed in more detail below.

The bridge logic 165 preferably couples the management processor 155 to management memory 190. Alternatively, the functions of bridge logic 165 may be integrated into the management processor 155, or to some other component. The bridge logic 165 preferably includes a memory controller to control and properly format transactions to the memory. In addition, the bridge logic also preferably couples the management processor to a management system bus 195. Arbitration of the management system bus 195 preferably is controlled by arbitration logic in the bridge logic 165. In the preferred embodiment the management local bus 195 comprises a PCI-style bus that may couple via a suitable bridge (such as bus connector 99) to the system bus 84 in the host system 100. Alternatively, the management local bus 195 may comprise any of a variety of other buses, including for example, an ISA (Industry Standard Architecture) bus.

The management processor 155 preferably has the same privileges as the host processor 25. Thus, the management processor 155 can reboot the system 100 without accessing the host processor 25. In the event that the management processor 155 is removed from the server system bus 84, or the bus fails, the management processor 155 can still operate and communicate with the other devices connected to the management system bus 195.

According to the preferred embodiment, certain firmware is stored in management memory 190, and used to control the operation of the management processor 155. One piece of software used by the management processor 155 is FTP (file transfer protocol) or TFTP Server software, which is commercially available. The FTP Server software is used to read image data from corresponding Client software at the remote console 200. Thus, the FTP Server software facilitates transfer of image data from the remote console 200 to the management processor 155, which then stores the image in management memory 190.

A second piece of firmware stored in management memory 190 is memory mapping software. The memory mapping software is used to translate the address of image data stored in management memory 190 into sector addresses corresponding to the location of the image on a floppy drive. When the image is received from remote console 200, it is stored sequentially in the management memory 190 according to normal convention. If the image reflects data that was obtained form a floppy drive, and if the data is represented as floppy drive data to the host processor 25, then the host processor will request data based on normal floppy drive formatting conventions. Thus, for example, the host processor will request data according to side, track and sector. In response to such a request from the host processor 25, the management processor 155 must be capable of determining which portion of the image stored in the management memory 190 should be made available to the host processor 25. This translation from the management memory address to a conventional floppy format is performed preferably by the memory mapping firmware. The memory mapping software monitors the starting address in the memory 150 of the image, and from that performs the necessary calculations to translate the side, track, sector formatted request into a specific memory address of the memory 150. This calculation is based on the conventional formatting of floppy disks, which for example, may contain 2 sides, 80 cylinder tracks on each side, and 32 sectors in each track, with 512 bytes of data in each sector. Based on this and knowing the start address of the image in memory 150, the memory mapper firmware can be programmed to translate a side, track, sector request from host processor 25 into the specific memory address where the requested data is located.

Referring still to FIG. 2, the remote console 200 couples to the management sub-system via communications link 175. The communications link 175 may comprise an Ethernet connection, a telephone line, a wireless communications link, or any other suitable communications media. It should also be understood that a combination of different types of communication media may be used to implement communications link 175. Thus, for example, the network interface 170 may connect to an Ethernet network, which couples to a modem, which in turn connects to a telephone line. It should also be understood that the connection between the management sub-system 150 and management console 200 may be implemented using the Internet, or through a company's intranet.

In the preferred embodiment, the remote console 200 comprises a conventional personal computer, and thus preferably includes a console processor 225, system memory 235, primary bridge 280 and secondary bridge 290, a monitor 275, and a network interface 270. The console processor 225 preferably couples to system memory 235 through a primary bus bridge 280. It should be understood that other embodiments of the invention may include more than one processor. The processor may comprise any suitable microprocessor such as the Pentium II®, Pentium III®, or Celeron® processor by Intel®, the Athlon® processor by AMD, or other microprocessors from these or other manufacturers that may be used or configured for use in a computer system. The system memory 235 preferably comprises one or more memory devices such as any suitable type of random access memory. System memory may comprise, for example, synchronous dynamic random access memory (SDRAM), or other memory designs suitable for use in a computer. The primary bridge 280 permits the console processor 225 and other devices in the management console 200 to read data from or write data to memory 235. Although not shown in FIG. 2, the primary bridge 280 may include an interface to an advanced graphics port (AGP) to support a graphics accelerator or other graphics devices (including a monitor) or memories that reside on an AGP bus.

The primary bridge 280 also preferably includes an interface to a system bus 285. In the preferred embodiment, the system bus 285 comprises a Peripheral Component Interconnect (PCI) bus, to which the primary bridge 280 interfaces. Various system bus compliant devices may connect to the system bus 285. Through primary bridge 280, the processor 225 can communicate with various system devices included in the remote console 200. In accordance with the protocol of various system busses, such as the PCI bus, various PCI bus masters may read data from and write data to system memory 235 via the primary bridge 280. The bridge 280 preferably includes a memory controller and arbiter (not specifically shown) to provide controlled and efficient access to system memory 235 by the various devices in the console 200.

The management console 200 preferably also includes a secondary bus bridge 290 which bridges the system bus 285 to other buses such as an Industry Standard Architecture (ISA) bus 124, sub-ISA bus, or X bus. Other devices, such as a hard disk drive 295, CD-ROM drive 240, and floppy drive 245, couple to secondary bus bridge 290. Other drives may also be provided as desired. Drives 240, 245 and 295 can be accessed by the processor 225 through the primary bridge 280 and secondary bridge 290. One of ordinary skill in the art will recognize that one or more disk drive controllers (not shown) may also be included to provide effective data transfers to and from these drives. Similarly, the keyboard 260 and mouse 255 also preferably couple to the secondary bridge 290. Also, a video monitor 275 couples to the system bus 280 (or to some other bus, such as an AGP bus) to receive video signals to be displayed. Still referring to FIG. 2, the management console 200 also preferably includes a network interface 270 or modem for coupling the console 200 to the management sub-system 150.

Figure 3:
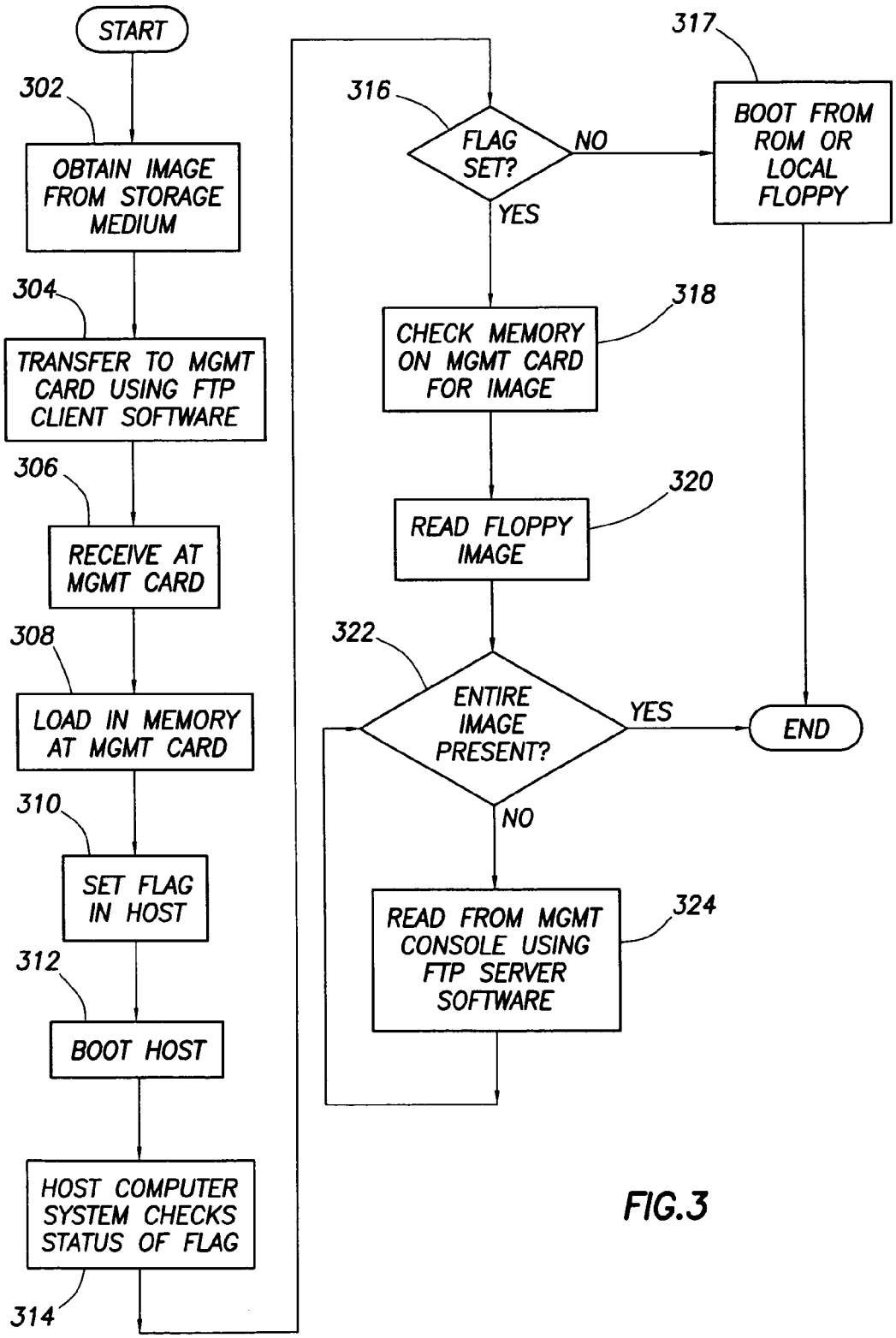
FIG. 3 is a flow chart depicting the operation of the system, according to an exemplary embodiment.

Referring now to FIGS. 2 and 3, the operation of the present invention will now be described. As indicated in step 302, an image is obtained at the remote console 200 for installing at the managed computer system (or host PC) 100. The image may be obtained in various ways, including downloading from a website or by receiving an image from another source. One typical way in which such an image may be obtained is by loading an image from a storage medium, such as a floppy disk placed in floppy drive 245 or a CD-ROM loaded in a CD-ROM drive 240. Alternatively, the image may be stored in the hard drive 295 of the management console 200, where it can be retrieved as required for managing remotely located computers. According to the preferred embodiment, the image comprises a relatively small data package that can be stored on the memory 190 in the management sub-system 150. According to the preferred embodiment, the image comprises less than 1.44 Megabytes of data, and thus can be loaded into the remote console via a floppy disk placed in floppy drive 245.

In step 304, the image is transferred to the management sub-system 150 from the management console 200. According to the preferred embodiment, conventional FTP (file transfer protocol) software or TFTP software is used to transfer the image from the remote management console 200 to the management sub-system 150. According to the preferred embodiment, the management sub-system 150 is loaded with Server FTP software that is executed by management processor 155, while the management console is loaded with Client FTP software to facilitate the transfer. The transferred image is received at the management sub-system 150, as indicated in step 306, and loaded into memory 190 in the management sub-system 150 in step 308.

After the image has been received and stored in memory 190, the management sub-system 150 preferably transmits a control signal to the host computer system 100, causing a special flag to be set in a suitable register, indicating that the management sub-system 150 has a bootable image that should be read during the subsequent boot cycle of the host computer system 100. Alternatively, instead of setting the flag, the host computer system 100 and management sub-system 150 may be programmed so that the host computer system automatically makes an inquiry to the management sub-system 150 during each boot cycle to determine if a bootable image has been stored in memory 190 at the management sub-system 150.

Subsequently, the host computer system 100 is booted in step 312. This may be in response to a re-boot command from the remote console 200, or may occur locally at the host computer system. As part of the boot cycle, the host computer system 100 preferably checks the status of the special flag in step 314. Alternatively, as noted above, the host computer system 190 may be programmed to automatically check for bootable images in the management sub-system 150. If the flag is not set (step 316), the host computer system performs a normal boot routine, and boots from the host ROM 80, or from boot code provided on the local floppy drive 45. If conversely, the flag is set (step 316), the host processor 25 checks the memory on the management sub-system 150 to determine if bootable code is present. The host processor 25 then performs a read cycle, requesting the image from the memory 190 on the management card. As noted above, the management processor 155 translates the read request, which may be in a side, track, sector format, into a local memory address to facilitate reading the data from memory 190. The image data then is returned to the host processor 25. If the entire image is obtained from memory 190 (step 322), then the operation terminates, and the host computer system 100 will execute the loaded image. If the entire image is not available from memory 190, the management processor 155 performs a read operation in step 324 targeting the management console 200 to obtain the rest of the data requested by the host processor 25. This continues until all of the requested data has been loaded on the host system 100.

It should also be noted that the image stored in the management memory 190 may be pre-installed in the memory by the manufacturer or reseller. The data stored in the management memory 190 may be stored temporarily in RAM, or more permanently in battery-backed RAM, non-volatile RAM, or ROM. It should also be understood that data compression techniques may be used when transferring and storing the image at the management sub-system 150. Compression may be used if bandwidth between the remote console and management sub-system 150 is limited or slow, or if the memory 190 in the management sub-system 150 is too small to store the entire image file.

As one skilled in the art will understand, the present invention may be used to provide remote operating system installation support. The idea can be expanded to implementing other support, including ROM software upgrades, performing diagnostic operations, and any other applications that are suitable to a boot environment.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system for managing a computer system, comprising:
a host computer system comprising a management sub-system, said management sub-system comprising a management processor and a management memory;
a remote management console capable of communicating remotely with said management sub-system;
wherein said management sub-system is capable of receiving an image of a bootable program for the host computer system from said remote management console, and wherein said image is stored in the memory in said management subsystem; and then
wherein said host computer system loads said image during its boot cycle, and executes said image as part of its boot cycle.

2. The system of claim 1, wherein said host computer system includes a processor and a host ROM that is programmed to check the management sub-system for bootable images, and wherein said processor accesses said host ROM during its boot cycle.

3. The system of claim 1, wherein said management sub-system comprises a computer card that may be installed within said host computer system.

4. The system of claim 3, wherein said host computer system includes a system bus, and said computer card couples to said system bus.

5. The system of claim 4, wherein said system bus comprises a PCI bus.

6. The system of claim 1, wherein said management sub-system includes a network interface that enables said management sub-system to transmit and receive signals via a local area network.

7. The system of claim 6, wherein said management sub-system couples to said remote management console via the local area network.

8. The system of claim 1, wherein said management subsystem includes a modem that enables said management sub system to transmit and receive signals via a telephone connection, and wherein said remote management console also includes a modem to facilitate communications with said management sub-system.

9. The system of claim 1, wherein the remote management console includes a console processor and peripheral drives capable of receiving storage medium, and wherein said console processor transfers data loaded in said peripheral drives to said management sub-system.

10. The system of claim 9, wherein said peripheral drives include a floppy drive, and said console processor transfers floppy images to said management sub-system, and said management sub-system stores said floppy image in said memory in said management sub-system.

11. The system of claim 10, wherein said management processor transmits a control signal to said host computer system when a floppy image is stored in said management memory, and wherein said control signal sets a flag in said host computer system.

12. The system of claim 11, wherein said host computer system checks the status of said flag during each boot cycle.

13. The system of claim 12, wherein said host computer system executes the floppy image during its boot cycle if said flag is set.

14. The system of claim 10, wherein said host computer system checks the management sub-system on each boot cycle to determine if a floppy image is present in the management memory.

15. The system of claim 1, wherein said remote management console includes file transfer protocol client software, and said management sub-system includes file transfer protocol server software for supporting the transfer of said image from said remote management console to said management sub-system.

16. A system for managing a computer, comprising:
a host computer system comprising
a processor;
a bus bridge coupled to said processor;
a system bus coupled to said bus bridge, and said system bus including at least one port configured to receive a peripheral device; and
a management sub-system including a management processor and memory, said management subsystem coupling to said system bus via said port;
a management console coupled to said management sub-system via a communications link, said management console including a console processor and one or more peripheral drives, and wherein said management console transfers images from said peripheral drive to said management sub-system via said communications link; and
wherein said management sub-system emulates a disk drive, so that the computer system checks the management sub-system during each boot cycle to determine if said management sub-system includes a bootable image.

17. The system of claim 16, wherein said one or more peripheral drives comprise at least one of a CD-ROM drive, hard drive, or a floppy drive.

18. The system of claim 17, wherein said management processor transmits a control signal to said host computer system when a bootable image is received from said management console.

19. The system of claim 18, wherein said management sub-system further comprises a network interface that couples to a local area network.

20. The system of claim 19, wherein said local area network couples to said management console via a telephone line.

21. The system of claim 20, wherein said local area network couples to said management console via the Internet.

22. A managed computer system capable of being controlled by a remote management console, said managed computer system comprising:
a host processor;
a system bus coupled to said processor by a bus bridge;
a system memory coupled to said processor;
a management sub-system coupled to said system bus, said management sub-system including:
a management processor;
a memory coupled to said management processor for storing software and data;
a network interface coupling said managed computer system to said remote management console via a communications link;
wherein said management sub-system is capable of receiving an image of a bootable program from said remote management console, and wherein said image is stored in the memory in said management sub-system; and
wherein said host processor loads said image during its boot cycle, and executes said image as part of its boot cycle.

23. The system of claim 22, wherein said managed computer system includes a host ROM coupled to said host processor, and wherein said processor accesses said host ROM during its boot cycle.

24. The system of claim 22, wherein said management sub-system comprises a computer card installed within said managed computer system.

25. The system of claim 22, wherein said management processor transmits a control signal to said managed computer system when a bootable image is stored in memory coupled to the management processor, and wherein said control signal sets a flag in said managed computer system.

26. The system of claim 25, wherein said managed computer system checks the status of said flag during each boot cycle.

27. The system of claim 26, wherein said host processor executes the bootable image stored in the memory coupled to the management processor during its boot cycle if said flag is set.

28. The system of claim 22, wherein said host processor checks the management sub-system on each boot cycle to determine if a bootable image is present in the memory coupled to the management processor.

* * * * *